United States Patent
Cox et al.

(10) Patent No.: US 7,424,928 B2
(45) Date of Patent: Sep. 16, 2008

(54) APPARATUS, SYSTEM AND METHOD FOR FLEXIBLY COUPLING SENSORS TO A DOWNHOLE TOOL

(76) Inventors: Dale Cox, 2185 S. Larsen Pkwy., Provo, UT (US) 84606; David R. Hall, 2185 S. Larsen Pkwy., Provo, UT (US) 84606; H. Tracy Hall, Jr., 2185 S. Larsen Pkwy., Provo, UT (US) 84606; Scott Dahlgren, 2185 S. Larsen Pkwy., Provo, UT (US) 84606; David S. Pixton, 2185 S. Larsen Pkwy., Provo, UT (US) 84606

( * ) Notice: Subject to any disclaimer, the term of this patent is extended or adjusted under 35 U.S.C. 154(b) by 325 days.

(21) Appl. No.: 11/162,503

(22) Filed: Sep. 13, 2005

(65) Prior Publication Data

US 2007/0056794 A1 Mar. 15, 2007

(51) Int. Cl.
G01V 1/00 (2006.01)
(52) U.S. Cl. .................. 181/111; 181/108; 181/121; 181/112; 367/25; 367/33; 367/911
(58) Field of Classification Search .............. 181/111, 181/108, 121, 112; 367/25, 33, 911, 75, 367/35
See application file for complete search history.

(56) References Cited

U.S. PATENT DOCUMENTS

| | | | |
|---|---|---|---|
| 3,205,477 A | | 9/1965 | Kalbfell |
| 5,801,642 A | * | 9/1998 | Meynier ................. 340/856.1 |
| 6,526,354 B2 | * | 2/2003 | Bose et al. ................... 702/14 |
| 6,679,332 B2 | | 1/2004 | Vinegar |
| 6,791,899 B2 | * | 9/2004 | Blanch et al. ................. 367/38 |
| 6,842,699 B2 | | 1/2005 | Estes |
| 6,868,035 B2 | * | 3/2005 | West ........................... 367/25 |
| 7,048,089 B2 | * | 5/2006 | West et al. .................. 181/105 |
| 7,079,954 B2 | * | 7/2006 | Ghosh ........................ 702/17 |
| 2003/0173143 A1 | * | 9/2003 | West ........................... 181/105 |
| 2004/0085857 A1 | * | 5/2004 | West ........................... 367/25 |
| 2004/0112594 A1 | | 6/2004 | Aronstam |
| 2005/0034917 A1 | * | 2/2005 | Mathiszik et al. ........... 181/108 |
| 2005/0104743 A1 | | 5/2005 | Ripolone |
| 2005/0150713 A1 | * | 7/2005 | Garcia-Osuna et al. ...... 181/108 |
| 2006/0187755 A1 | * | 8/2006 | Tingley ....................... 367/82 |
| 2007/0056794 A1 | * | 3/2007 | Cox et al. .................... 181/111 |

* cited by examiner

*Primary Examiner*—Lincoln Donovan
*Assistant Examiner*—Forrest Phillips
(74) *Attorney, Agent, or Firm*—Daniel P. Nelson; Tyson J. Wilde

(57) ABSTRACT

A downhole receiver for gathering seismic and sonic data from inside a borehole includes a substantially tubular housing adapted for axial connection to a tool string, and one or more sensors. A damping element is provided to flexibly couple each sensor to the tubular housing. An actuator extends the one or more sensors substantially radially with respect to the tubular housing to clamp the sensors against the wall of the borehole. In selected embodiments, the sensors may be one or multiple component geophones, accelerometers, hydrophones, vibrometers, or the like.

21 Claims, 12 Drawing Sheets

APPARATUS, SYSTEM AND METHOD FOR FLEXIBLY COUPLING SENSORS TO A DOWNHOLE TOOL

BACKGROUND OF THE INVENTION

1. Field of the Invention

The present invention relates to downhole drilling seismology and more particularly to apparatus, systems, and methods for implementing seismic and sonic sensors in downhole drill strings.

2. Background

The primary aim of seismic exploration for new oil reserves and development of known reserves is determining the location, shape, and type of reflectors that exist in subterranean formations. A reflector is generally any feature in the formation where there is a change in acoustic impedance. Reflectors may include boundaries between different sedimentary formations, faults, cracks, cavities, zones permeated with different fluids or gases, and zones exhibiting a gradient in pore pressure.

In a conventional surface seismic survey, both sources and receivers are positioned at or near the surface. A source may include a device such as a mechanical wave generator, an explosive, or an air gun, to create seismic or sonic waves to travel through the earth. When the waves bounce off an underground reflector, they are detected by receivers adapted to detect phenomena such as velocity, acceleration, or fluid pressure. Receivers may include, for example, geophones, accelerometers, hydrophones, or similar devices. Seismic survey equipment may be used to synchronize the sources and receivers, record pilot signals representative of the source, and record reflected waveforms detected by the receivers. The recorded data may then be processed to graphically display the time needed for seismic waves to travel between the surface and underground reflectors. If the velocity of seismic waves in each subterranean layer may be determined, the position of each reflector may be calculated.

Although surface seismic surveys are the most widely used type of geophysical survey, they are hindered by noise, interference, and attenuation that may occur at or near the surface. Another disadvantage of surface seismic surveys is their inability to determine the velocity of seismic waves traveling through the underground formations. These velocity measurements are needed to accurately transform the subsurface seismic map from the time domain to the spatial domain. To obtain these measurements, a wireline tool comprising a seismometer is typically lowered into a borehole. In some cases, the seismometer is clamped against the formation inside the borehole to improve the quality and accuracy of measurements taken.

Although a wireline seismic survey may be used to obtain accurate seismic data, this type of survey typically requires lengthy and expensive interruptions of the drilling process, thereby increasing the non-productive time (NPT) of a drilling operation. To avoid NPT associated with wireline surveys, measurement-while-drilling (MWD) and logging-while-drilling (LWD) tools have been developed. However, MWD and LWD tools generally communicate with the surface via mud-pulse telemetry, which is usually limited to the order of 10 bits/second. Due to these data rate limitations and the resulting inability to send complete waveforms to the surface in real time, the development of MWD tools for gathering and transmitting seismic data to the surface has been limited. Furthermore, because of the possibility that the drill string may become stuck in the borehole, MWD seismic tools that have been developed are typically not clamped inside the borehole, unlike their wireline counterparts. This may result in a relatively poor coupling with the borehole and may reduce the quality and utility of seismic data gathered by these tools.

Accordingly, what are needed are improved apparatus, systems, and methods for gathering seismic data while drilling. More particularly, apparatus, systems, and methods are needed for clamping seismic receivers to the formation inside the borehole, while reducing the possibility that the drill string will become stuck while drilling. Further needed are apparatus, systems, and methods that are able to isolate seismic receivers from vibrations propagating through the drill string. Further needed are apparatus, systems, and methods for calculating the divergence and curl of seismic waves, thereby enabling the differentiation of compression waves from shear waves. Such apparatus, systems, and methods are disclosed herein.

SUMMARY OF THE INVENTION

The present invention has been developed in response to the present state of the art, and in particular, in response to the problems and needs in the art that have not yet been fully solved by currently available seismic MWD apparatus, systems, and methods. Accordingly, the present invention has been developed to provide improved apparatus, systems, and methods for gathering seismic data. More particularly, the present invention provides apparatus, systems, and methods for clamping downhole seismic receivers to the borehole, while minimizing or reducing the possibility that the receivers will become stuck in the borehole. Further disclosed are apparatus, systems, and methods for isolating seismic receivers from vibrations propagating through the drill string. Further provided are apparatus, systems, and methods for calculating the divergence and curl of seismic waves to enable the differentiation of compression waves from shear waves.

Consistent with the foregoing, and in accordance with the invention as embodied and broadly described herein, a downhole tool for gathering formation data from inside a borehole is disclosed in one aspect of the present invention as including a substantially tubular housing adapted for axial connection to a tool string, and one or more sensors. A damping element is provided to flexibly couple each sensor to the tubular housing. An actuator extends the one or more sensors substantially radially with respect to the tubular housing to clamp the sensors against the wall of the borehole.

In selected embodiments, the sensors may be one or three component geophones, accelerometers, hydrophones, vibrometers, or the like. For example, in certain embodiments, the sensors may be a laser-doppler vibrometer, a miniature electro-mechanical system (MEMS) geophone, or the like. In certain embodiments, the sensors may comprise eight geophones arranged in a rectangular shape proximate the outer periphery of the tubular housing. Similarly, in another embodiment, the sensors may comprise six geophones divided into three differential pairs. Each of these differential pairs may be used to measure the derivative of seismic waves along three mutually orthogonal axes.

In certain embodiments, the damping element may be a diaphragm or a bellows. The damping element may also include an additional damping material such as an elastomeric material, rubber, foam, gel, polymer rods, or the like, to further dampen vibrations that may be propagating through the drill string. Similarly, in certain embodiments, the actuator may be a hydraulic actuator.

In another aspect of the invention, a downhole drilling system for gathering formation data from inside a borehole may include a downhole drill string, a source connected to the drill string and adapted to generate seismic or sonic waves, and a receiver connected to the drill string and adapted to receive the seismic or sonic waves from the source. The receiver includes a substantially tubular housing adapted for axial connection to the drill string. The receiver further includes one or more sensors, a damping element flexibly coupling the tubular housing to the one or more sensors, and an actuator to extend the one or more sensors substantially radially with respect to the tubular housing. In certain aspects, the invention may be used for 3 D and/or 4 D seismic applications. It should be noted that a tool string may refer to both a string of drilling pipe and a string or production pipe.

The present invention provides novel apparatus and methods for gathering seismic data from inside a borehole while drilling. The features and advantages of the present invention will become more fully apparent from the following description and appended claims, or may be learned by the practice of the invention as set forth hereinafter.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings

DETAILED DESCRIPTION OF THE INVENTION

Reference throughout this specification to "one embodiment," "an embodiment," or similar language means that a particular feature, structure, or characteristic described in connection with the embodiment is included in at least one embodiment in accordance with the present invention. Thus, use of the phrases "in one embodiment," "in an embodiment," and similar language throughout this specification may, but does not necessarily, all refer to the same embodiment.

Furthermore, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
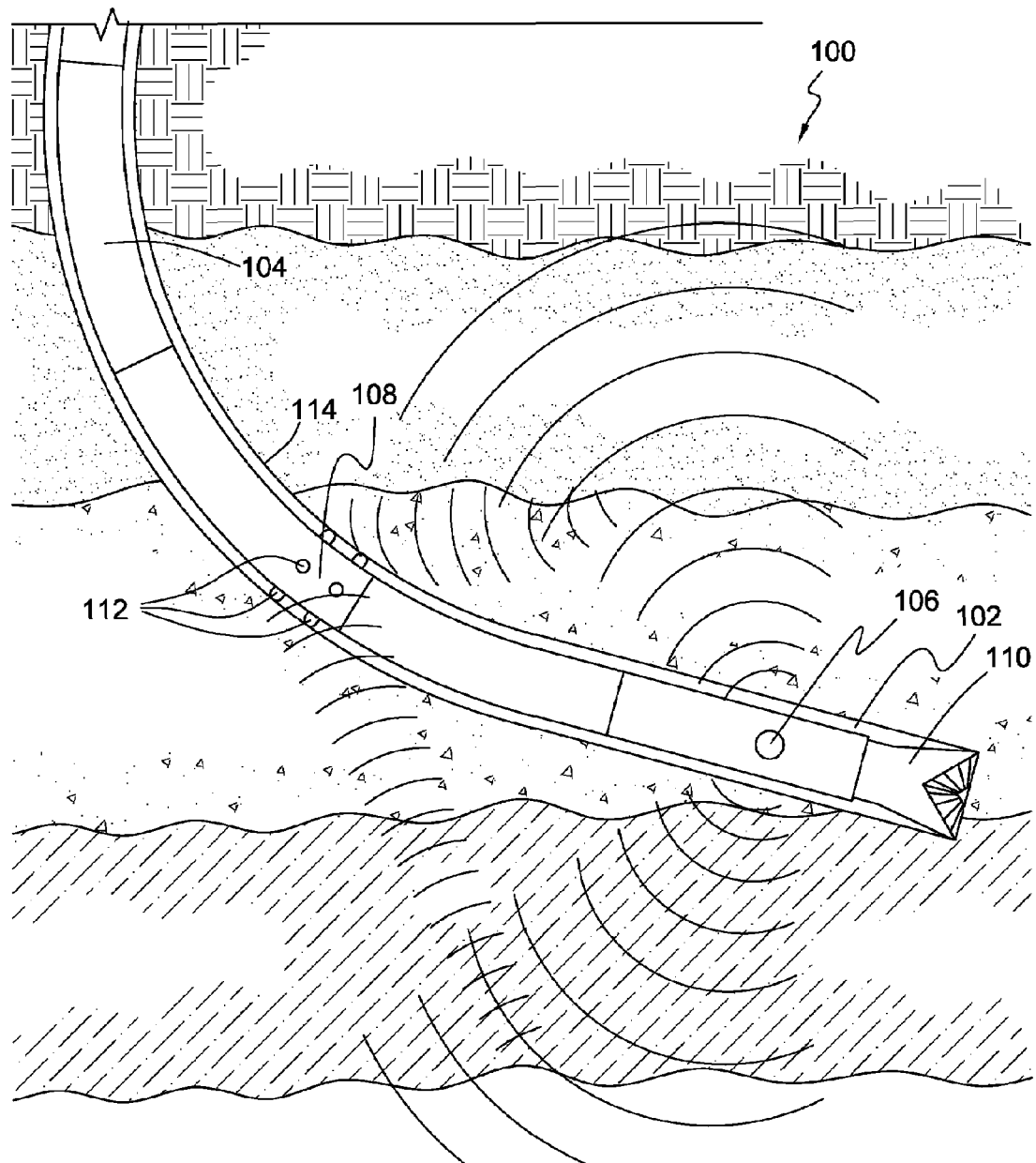
FIG. 1 is a profile view illustrating one embodiment of a drill string incorporating a seismic and sonic receiver in accordance with the invention.

Referring to FIG. 1, a downhole drilling system 100 for gathering seismic data from inside a borehole 102 may include a downhole drill string 104, a source 106 adapted to generate seismic or sonic waves, and a receiver 108 adapted to receive the seismic or sonic waves from the source 106 after the waves are reflected by underground formations. A source 106 may include various devices including, for example, an air gun, a vibrator, a sparker, or a mechanical wave generator such as a downhole hammer, jar, or the like. Waves generated by the source 106 may propagate through the formation until they encounter a change in acoustic impedance, which causes a reflection. A receiver 108 connected to the drill string 104 may include one or more sensors 112 to detect these reflections in order to generate a map of the formation's physical characteristics. These sensors 112 may include, for example, one or three component geophones, accelerometers, hydrophones, vibrometers, or the like. In selected embodiments, the sensors 112 may include miniature electromechanical system (MEMS) geophones or accelerometers, or laser-doppler vibrometers (LDV). By placing both the source 106 and the receiver 108 on the drill string 104, a seismic system may be created that looks ahead of the drill bit 110, thereby enabling steering or directing the drill string 104 more precisely in the direction of oil or other hydrocarbon reserves.

To optimize the performance of motion sensors 112 like geophones and accelerometers, a firm and uninterrupted interface between the sensors 112 and the borehole wall 114 is preferred. Absent this coupling, seismic waves may be converted to pressure waves in the borehole fluid, adding two additional interfaces to the wave path, and causing loss of directional information. A receiver 108 in accordance with the invention may create the interface between the sensors 112 and the formation by clamping or pressing these sensors 112 against the wall 114 of the borehole when the drill string 104 has stopped rotating, thereby providing improved mechanical coupling for conducting seismic or sonic waves to the sensors 112. However, because of the risk that the drill string 104 will become stuck when clamping or pressing these sensors 112 against the borehole wall 114, the receiver 108 is designed to minimize or eliminate the risk of becoming stuck as will be described herein. Furthermore, because vibrations or other noise may propagate through the drill string 104 and interfere with vibrations or other waves detected at the borehole wall 114, a receiver 108 in accordance with the invention may include apparatus and methods to isolate the sensors 112 from these undesired drill string vibrations, as will be discussed herein.

Figure 2:
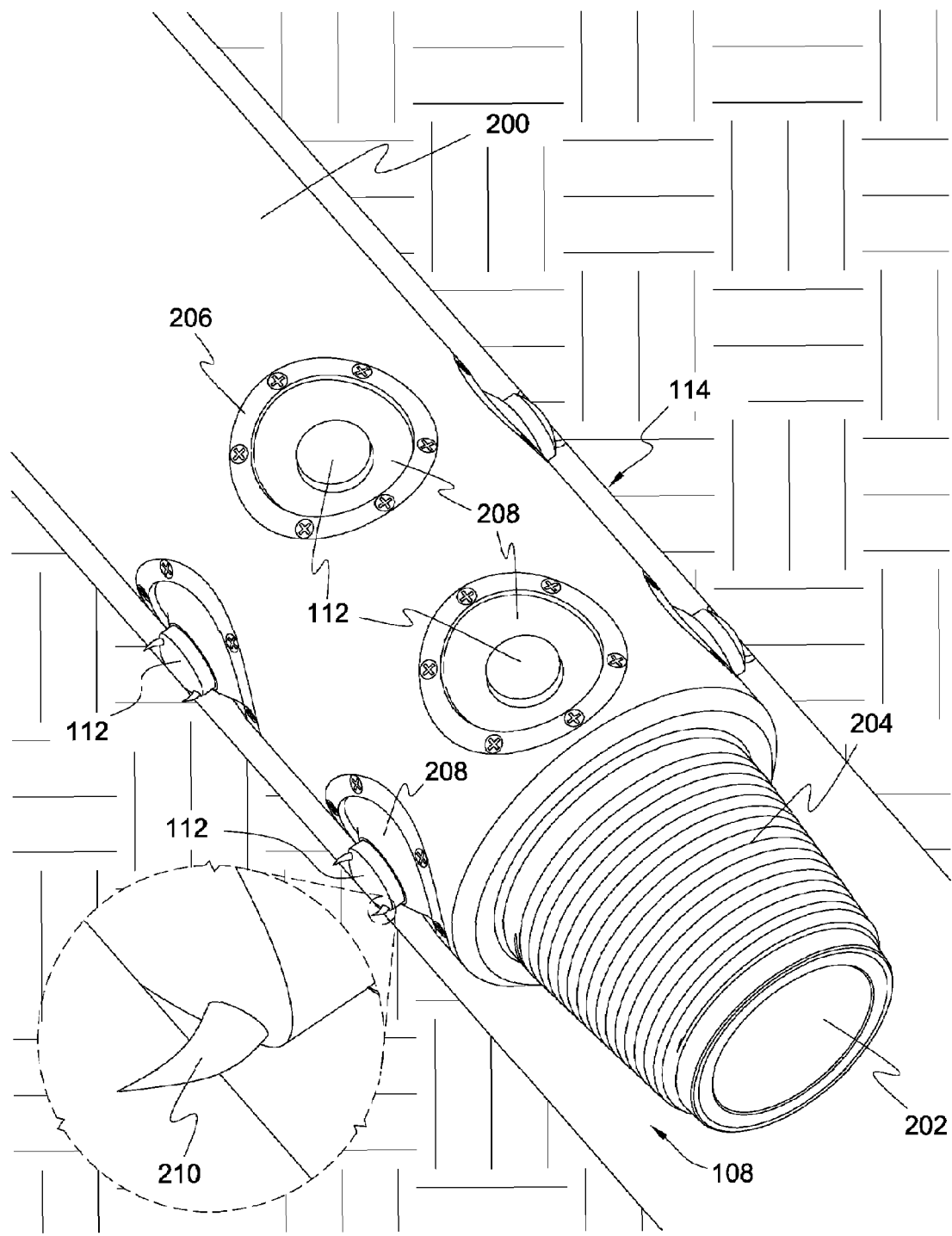
FIG. 2 is a perspective view of one embodiment of a receiver in accordance with the invention.

Referring to FIG. 2, a receiver 108 in accordance with the invention may include a tubular housing 200 comprising a central bore 202 and adapted for axial connection to a drill string 104. Thus, in certain embodiments, the tubular housing 200 may include a threaded pin end 204 and a box end (not shown) connectable to a drill string 104. In some embodiments, the receiver 108 may be embodied as an independent tool. In other embodiments, the receiver 108 may be integrated into another downhole tool that performs other functions. In certain embodiments, the downhole receiver 108 may be implemented in a downhole drill string 104 comprising a high-speed network for transmitting data to and from the surface. Such a system is disclosed, for example, in U.S. Patent Publication No. 20050035874 directed to a "Distributed Downhole Drilling Network," and U.S. Pat. No. 6,717,501 directed to a "Data Transmission System for a String of Downhole Components," which are both herein incorporated by reference for all that they contain. Seismic and sonic data gathered by the receiver 108 may utilize such a high-speed network for transmitting data to the surface in real time and at data rates far exceeding those possible using conventional mud-pulse telemetry or other conventional transmission systems. Such a high-speed network may enable the sensors to be in communication with downhole equipment, such as a directional drilling system. This may be desirable to allow the directional drilling system to automatically adjust depending on what information is received from the sensors. U.S. Pat. No. 6,641,434 to Boyle et al and U.S. Pat. No. 6,688,396 to Floerke et al, which are herein incorporated for all that they contain, also disclose downhole telemetry systems that may be compatible with the present invention.

As previously mentioned, the receiver 108 may include one or more sensors 112 which may be clamped against the borehole wall 114. The sensors 112 may be coupled to the housing 200 by way of damping elements 208 which may allow the sensors 112 to extend toward the borehole wall 114. The damping elements 208 may serve to substantially isolate the sensors 112 from vibrations or other waves propagating through the housing 200. Furthermore, the damping elements 208 may seal openings between the sensors 112 and the housing 200, not only to prevent the passage of materials or contaminants therethrough, but to also to enable hydraulics or other sealed actuating mechanisms to press the sensors 112 against the borehole wall 114. Such actuators will be described in more detail in the description associated with FIGS. 5 through 8.

In certain embodiments, the receiver 108 may include spiral stabilizer-like ribs (not shown) to provide radial clearance between the receiver 108 and the borehole wall 114. These stabilizer ribs may be used to keep the receiver 108 approximately centered in the borehole, so that the sensor actuator, one embodiment of which is illustrated in FIGS. 5 through 8, does not have to center the receiver 108 within the borehole 114. The sensor actuator may only need to provide adequate force to couple the sensors 112 to the borehole wall 114.

In the illustrated embodiment, the damping element 208 is configured as a diaphragm 208 which may be deformed in response to an applied pressure differential. In certain embodiments, the diaphragm 208 may be constructed of a flexible elastomeric material capable of withstanding the rigors of a downhole environment. Furthermore, the diaphragm 208 may also provide a safety mechanism to prevent the receiver from becoming stuck in the borehole. For example, if the sensors 112 become stuck against the borehole wall 114, the diaphragms 208 may be designed to rupture when the drill string 104 is rotated. If the sensors 112 are actuated by a hydraulic or other fluid-actuated system, the rupture may cause the hydraulic or other fluid to release, thereby freeing the sensors 112. Although this may impair the function of the receiver 108 until the diaphragms 208 are repaired, it provides some assurance that the drill string 104 will not become stuck in the borehole.

In certain contemplated embodiments, the diaphragms 208 may be secured to the housing by way of a ring 206 or other coupling element 206, which may be attached to the housing 200 with screws or other attachment means know to those skilled in the art. Furthermore, the sensors 112 may optionally include gripping or indentation means 210 to improve the interface between the sensors 112 and the borehole wall 114. The gripping means 210 may include various surface features and textures, such as the illustrated spikes, to mechanically engage the borehole wall to improve the interface therebetween.

Figure 3:
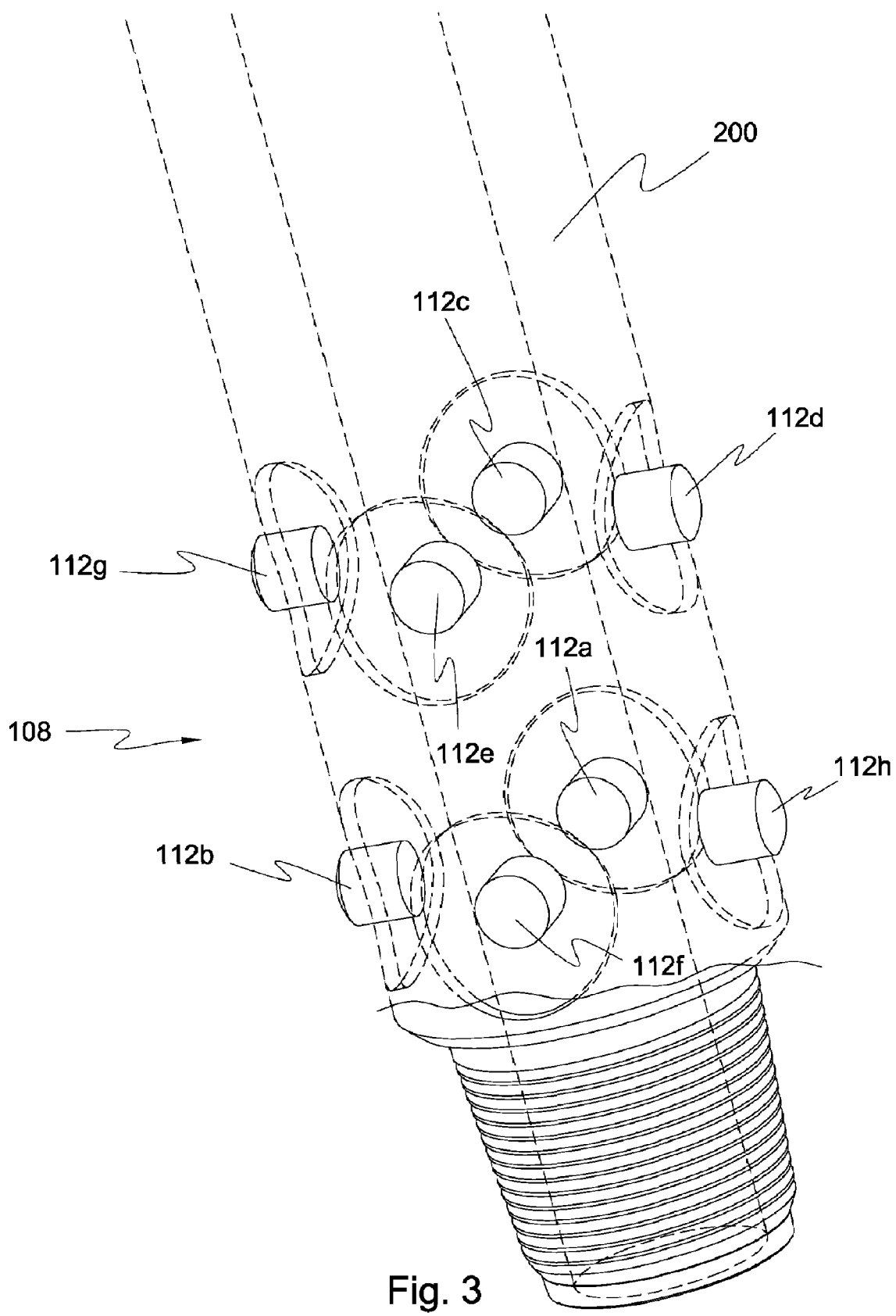
FIG. 3 is a transparent perspective view of one embodiment of a receiver in accordance with the invention showing the placement of various sensors.

Referring to FIG. 3, in certain embodiments, sensors 112a-h may be distributed around the tubular housing 200 in a substantially rectangular prismatic or cubic arrangement. As will be described in more detail in the description associated with FIG. 4, this arrangement enables differentiating compression waves (P-waves) and shear waves (S-waves) by using data gathered from three differential pairs of sensors 112a-f (i.e., a first pair 112a, 112b, a second pair 112c, 112d, and a third pair 112e, 112f). The sensors 112a-f are aligned along three different orthogonal axes, which enables use of the sensors 112a-f to take spatial derivatives, such as the divergence and curl, of seismic waves. These spatial derivatives may be used to differentiate compression and shear waves. In selected embodiments, the remaining pair 112g, 112h of sensors may be used to provide two conventional vertical seismic profiling (VSP) signals that would provide additional directional compressional and shear wave information.

In selected embodiments, each of the sensors 112a-h is a three-component geophone located at the corner of the cube. In this embodiment, each three-component geophone includes three one-component geophones aligned with the faces of the cube, as will become apparent from the description associated with FIG. 4. The one-component geophones may be connected pair-wise to provide the divergence and curl of the seismic or sonic wave vector.

Where a digitizer is used to convert the analog outputs of the geophones to a digital output, the precision needed for the digitizer may be estimated by examining the range of amplitudes and time scales associated with waves expected in the downhole environment. For example, if one considers a cosine wave in one spatial dimension, as represented by the expression $A\cos(\omega(t-x/v))$, wherein A is the amplitude of the cosine wave, $\omega$ is the angular frequency in radians/second (also equal to $2\pi f$), f is the frequency in Hertz or cycles/second, t is the time in seconds, x is the position in a single dimension in feet, and v is the velocity of sound in the medium in feet/second. As mentioned previously, the receiver 108 may use two closely-spaced sensors 112 to calculate a spatial derivative of this wave. If one takes the spatial derivative of the cosine wave, the result is $A(\omega/v)\sin(\omega(t-x/v))$. The amplitude of the derivative is $A(\omega/v)$. That is, if the amplitude of the plane wave is A then the amplitude of the derivative of the plane wave is $A(\omega/v)$. Thus, the ratio of the amplitude of the derivative plane wave with respect to the amplitude of the plane wave itself is $\omega/v$, or $2\pi f/v$.

The amplitude ratio for seismic and sonic waves, divided by $2\pi f/v$, is summarized in the table below, where the conventional seismic or sonic amplitude is set equal to one:

| Frequency (Hz) | Velocity 4000 ft/s | Velocity 10000 ft/s | Velocity 20000 ft/s |
|---|---|---|---|
| 5 (surface/VSP) | .00125 | .0005 | .00025 |
| 50 (surface/VSP) | .0125 | .005 | .0025 |

-continued

| Frequency (Hz) | Velocity 4000 ft/s | Velocity 10000 ft/s | Velocity 20000 ft/s |
|---|---|---|---|
| 100 (surface/VSP) | .0250 | .01 | .005 |
| 500 (crosswell) | .125 | .05 | .025 |
| 1000 (crosswell) | .25 | .1 | .05 |
| 2000 (crosswell/sonic) | .5 | .2 | .1 |
| 5000 (sonic) | 1.25 | .5 | .25 |
| 10000 (sonic) | 2.5 | 1.0 | .5 |

As shown by the above table, for the selected range of sound velocity and frequency, the derivative amplitude in the surface/VSP band ranges from approximately 0.025% to 2.5% of the original amplitude, which is equivalent to about −30 to −75 dB. If one digitizes the output from the individual sensors 112 and then takes the derivative, the digitizers should preferably have at least five to twelve additional bits of precision (a factor of 32 to 4,096) over typical seismic digitizers in order to give the necessary precision for the derivative data. Most geophones have 24 bits of precision (1 part in about 17 million.), although the waveform itself may be adequately described using only about 8 bits of precision, or 1 part in 256. The additional precision of the geophones is used to accommodate the wide dynamic range of geophysical signals. From the above table data, it is also apparent that spatial derivatives of lower frequencies are attenuated the most.

In certain embodiments, an amplified analog derivative may be obtained by differencing the output of two geophones using a precision operational amplifier. The analog derivative may then be digitized using a typical seismic digitizer. Because of the wide dynamic range of geophysical signals, the op-amp preferably has a large dynamic range. In another embodiment, a pair of sensors 112 may be wired such that the output voltages of the sensors 112 are subtracted. The result may then be sent through an amplifier stage before being digitized. Both methods may have an additional benefit in that it may be used to suppress common-mode vibrational noise.

Furthermore, if digitizers are used for each of the sensors 112, then the digitizers will likely only require synchronization on the order of approximately 100 microseconds, which is readily accomplished. This may be illustrated by letting t represent the time required for a wave to travel between two sensors 112, x represent the distance between two sensors 112, and v represent the velocity of the waves traveling through the formation. If x equals approximately one foot, and v equals approximately 10,000 feet/second, then t will equal approximately 0.0001 seconds, or 100 microseconds. The sample rate is set by the maximum frequency of the waves. Thus, the synchronization, at least in this example, may be on the order of approximately 100 microseconds. If the wave velocity through the formation or distance between sensors changes, then the synchronization calculation will change correspondingly.

Figure 4:
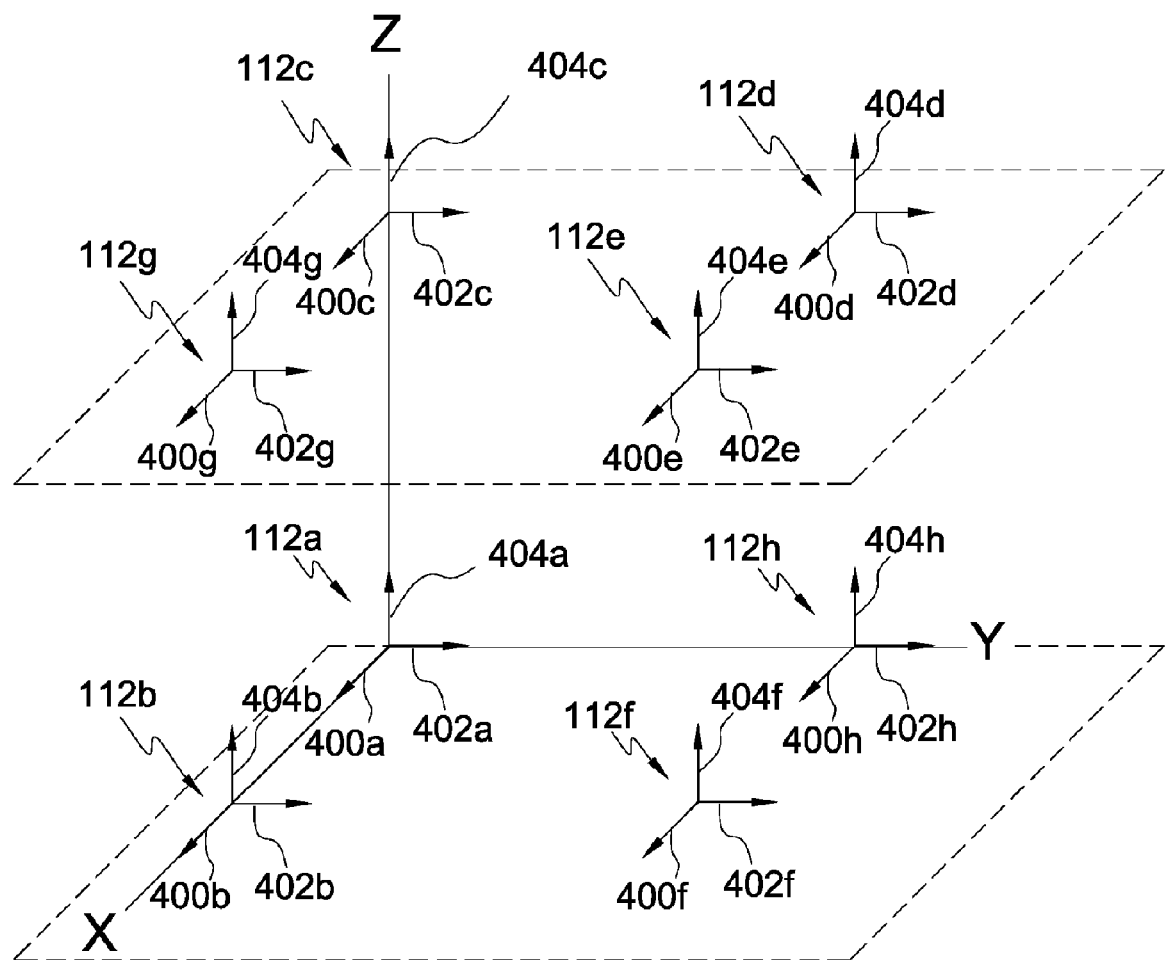
FIG. 4 is a diagram illustrating the orientation and placement of various sensors within the receiver.

Referring to FIG. 4, as previously mentioned, each of the sensors 112 may be located at the corners of a cubic or rectangular prismatic shape. In this illustration, each sensor 112a-h is represented by three vectors (such as the vectors 400a, 402a, 404a of the sensor 112a) to represent the x, y, and z directional component of each sensor 112a-h. All eight vectors 400a-h are parallel to the X axis; all vectors 402a-h are parallel to the Y axis, and all vectors 404a-h are parallel to the Z axis. Depending on the type of sensors 112 used (i.e., whether the sensor is a geophone, accelerometer, etc), the vectors (e.g., 400a, 402a, 404a) represent the displacement, velocity (the first derivative of displacement with respect to time), or the acceleration (the second derivate of displacement with respect to time). The sensors 112a-h may be divided up into three pairs, each pair parallel to one of the X, Y, or Z axes. These pairs may include a first pair 112a, 112b to calculate a derivative along the X-axis, a second pair of sensors 112c, 112d to calculate a derivative along the Y-axis, and a third pair of sensors 112e, 112f to calculate a derivative along the Z-axis. This leaves a remaining pair 112g, 112h of sensors that may be used, for example, to generate two conventional VSP signals that would provide additional directional compressional and shear wave information.

To calculate the compression wave, which is the equivalent of the divergence of the wave vector, the partial derivative of the x-component of the wave vector along the x-direction may be determined by calculating the difference between the vector measurements 400a, 400b, divided by the distance between the sensors 112a, 112b; the partial derivative of the y-component of the wave vector along the y-direction may be determined by calculating the difference between the vector measurements 402c, 402d, divided by the distance between the sensors 112c, 112d; and the partial derivative of the z-component of the wave vector along the z-direction may be determined by calculating the difference between the vector measurements 404e, 404f, divided by the distance between the sensors 112e, 112f. These three partial derivatives may then be summed to calculate the compression, or P-wave, as represented by the following expression:

$$p = \frac{\partial v_x}{\partial x} + \frac{\partial v_y}{\partial y} + \frac{\partial v_z}{\partial z}$$

The shear wave may be determined by calculating the curl of the seismic wave along each of the X, Y, and Z directions individually. To calculate the curl along the x-direction, the partial derivative of the z-component of the wave vector along the y-direction (determined by calculating the difference between the vector measurements 404c, 404d, divided by the distance between the sensors 112c, 112d) is subtracted from the partial derivative of the y-component of the wave vector along the z-direction (determined by calculating the difference between the vector measurements 402e, 402f, divided by the distance between the sensors 112e, 112f), as represented by the expression:

$$s_x = \frac{\partial v_y}{\partial z} - \frac{\partial v_z}{\partial y}$$

Similarly, to calculate the curl along the y-direction, the partial derivative of the x-component of the wave vector along the z-direction (determined by calculating the difference between the vector measurements 400e, 400f, divided by the distance between the sensors 112e, 112f) is subtracted from the partial derivative of the z-component of the wave vector along the x-direction (determined by calculating the difference between the vector measurements 404a, 404b, divided by the distance between the sensors 112a, 112b), as represented by the expression:

$$s_y = \frac{\partial v_z}{\partial x} - \frac{\partial v_x}{\partial z}$$

Finally, to calculate the curl along the z-direction, the partial derivative of the y-component of the wave vector along the x-direction (determined by calculating the difference between the vector measurements 402a, 402b, divided by the distance between the sensors 112a, 112b) is subtracted from the partial derivative of the x-component of the wave vector along the y-direction (determined by calculating the difference between the vector measurements 400c, 400d, divided by the distance between the sensors 112c, 112d), to yield the expression:

$$s_z = \frac{\partial v_x}{\partial y} - \frac{\partial v_y}{\partial x}$$

The definition of derivative requires a division by the distance between each differential pair of sensors 112a-h. However, because the distance between each differential pair of sensors 112a-h is roughly equal when the sensors are arranged in a cube shape, this division step may be omitted. If required, the scaling that occurs from omitting the division step can be corrected later when the data received from the sensors 112a-h is processed. Conversely, if the differential pairs of sensors 112a-h are arranged in a rectangular prismatic shape, this may require explicit division by the different rectangle dimensions. There are, of course, other possible pairings to create the differential pairs of sensor 112a-h used to differentiate and calculate the P-wave and S-wave. The selections, or pairings, as represented in FIG. 4 simply represent one embodiment that may be used to minimize crosstalk in the wiring and electronics associated with the sensors 112a-h.

In certain embodiments, it may also be preferable or necessary that the relative amplitudes of the shear wave components be preserved. To aid in maintaining these relative amplitudes, the difference circuits associated with each differential pair of sensors 112a-h may be matched.

As illustrated in FIG. 4, the partial derivatives calculated with the differential pairs of sensors 114a-h (i.e., differential pair 112a, 112b along the X-axis, differential pair 112c, 112d along the Y-axis, and differential pair 112e, 112f along the Z-axis) are measured with respect to three different origins. The partial derivative calculated parallel to the X-axis is measured with respect to an (x, y, z) origin; the partial derivative calculated parallel to the Y-axis is measured with respect to an (x, y, z+dz) origin; and the partial derivative calculated parallel to the Z-axis is measured with respect to a (x+dx, y+dy, z) origin. One can show that these derivatives negligibly differ from derivatives taken at an (x+dx/2, y+dy/2, z+dz/2) origin. Thus, in certain embodiments, the center of the cube of sensors 112a-h may be used as the approximate origin of the calculated derivatives. If the size of the cube is small relative to the spacing of the VSP levels, then these approximations provide acceptable accuracy. Moreover, these approximations may also be quite accurate even where the VSP level spacing is on the order of the size of the cube.

By pairing the sensors differentially, the number of signals that need to be digitized to calculate the P-waves and S-waves is greatly reduced. For example, P-wave detection may involve six sensors 112, which may be differenced, summed, and then digitized to provide a single digital signal. Similarly, the calculation of each S-wave component (i.e., in the x, y, or z direction) may involve four sensors 112 to produce a single difference, thereby providing three digital signals corresponding to each of the x, y, and z directions. If the two conventional VSP signals measured with sensors 112g, 112h provide six additional digital signals, this yields a total of ten digital signals derived from an original twenty-four sensors (i.e., the twenty-four sensors of the eight three-component sensors 112a-h).

Figure 5:
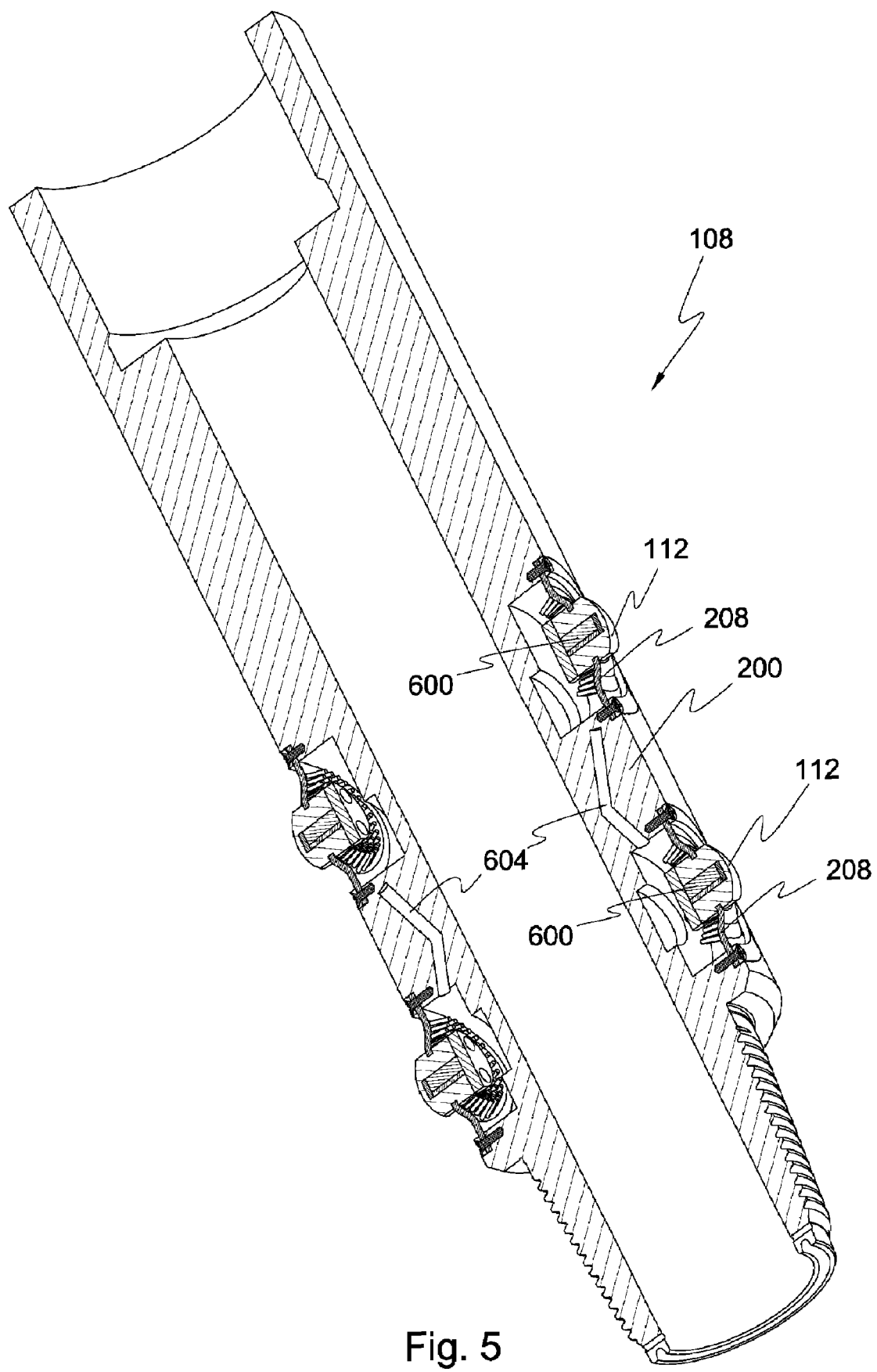
FIG. 5 is a cross-sectional perspective view of one embodiment of a receiver in accordance with the invention.
Figure 6:
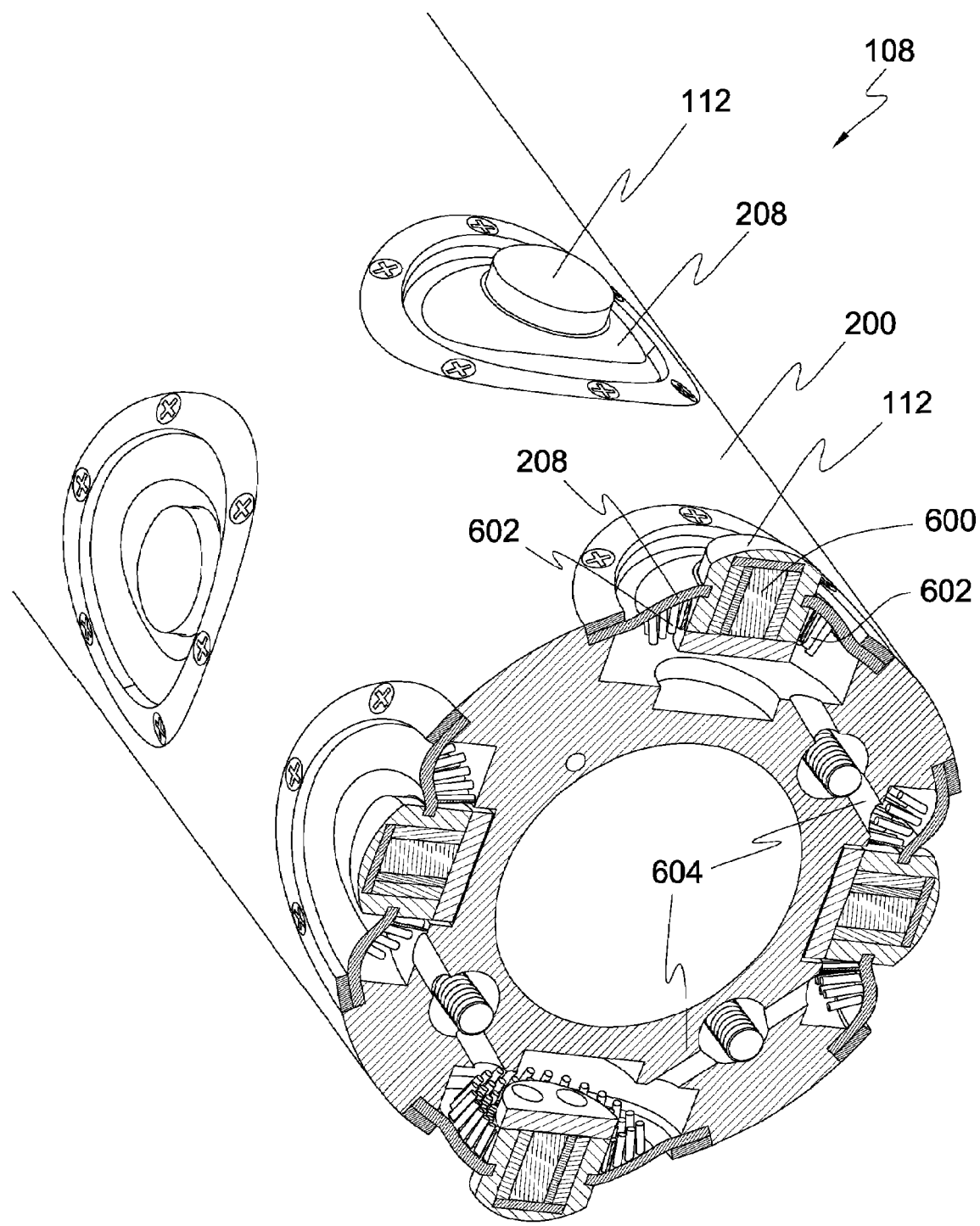
FIG. 6 is another cross-sectional perspective view of one embodiment of a receiver in accordance with the invention.

Referring to FIGS. 5 and 6, several cross-sectional views of one embodiment of a receiver 108 in accordance with the invention are illustrated. As illustrated, in one embodiment, a receiver 108 may include curved elastomeric diaphragms 208 flexibly coupled to the sensors 112, the natural position of the diaphragms 208 being relaxed inward. Each of the diaphragms 208 may be plumbed in parallel to a hydraulic actuator manifold, comprising various fluid channels 604 providing hydraulic or other fluid to the diaphragms 208, integrated into the housing 200. Thus, the diaphragms 208 will be synchronized and will either be relaxed inward or extended outward together. FIG. 6 shows several sensors 112 relaxed inward, and others extended outward, simply for sake of illustration to show the contemplated range of motion of the diaphragms 208 and sensors 112.

In certain embodiments, the sensors 112 comprise geophones 600, accelerometers 600, or the like, housed in a domed cylinder that is sealed in the center of each diaphragm 208, wherein the tip of the dome makes contact with the formation. Where three-component geophones are used, each of the three components of the geophone may be mounted on a different perpendicular axis in a cube-shaped or other recess milled within each domed cylinder. Wires or other transmission means (not shown) may be connected to each sensor 112. In certain embodiments, these wires or transmission means may be very thin due to small signal currents transmitted from the sensors 112 and they may be coiled like a telephone handset cable to permit extension and retraction.

In selected embodiments, the inside of the diaphragm 208 may be filled with an open-cell foam made up of an elastomeric material filled with microscopic particles of tungsten. In other embodiments, the diaphragm 208 itself may be filled with similar particles. Such composite materials are known to strongly dampen sound. Since foam is difficult to render, an array of polymer rods 602 has been substituted for the foam in the drawing. The diaphragm 208 may be actuated by a lossy fluid, such as a low-viscosity silicone oil filled with dense particles, such as barite or tungsten. The dense particles may be synthesized at nanometer size or may be milled to that size, so as to remain permanently in suspension in the fluid. Such fluids are also known to have strong sound-damping characteristics.

Note that in FIGS. 5 and 6 the sensors 112 do not appear to be oriented parallel to the faces of the larger cube formed by the array sensors 112, as illustrated in FIG. 4. Instead, for the sake of simplifying illustration of the sensors 112, the sensors 112 are graphically oriented parallel and perpendicular to the diameter of the receiver 108. For such an embodiment, different pairs of sensors would be selected for desired differential measurements.

Figure 7:
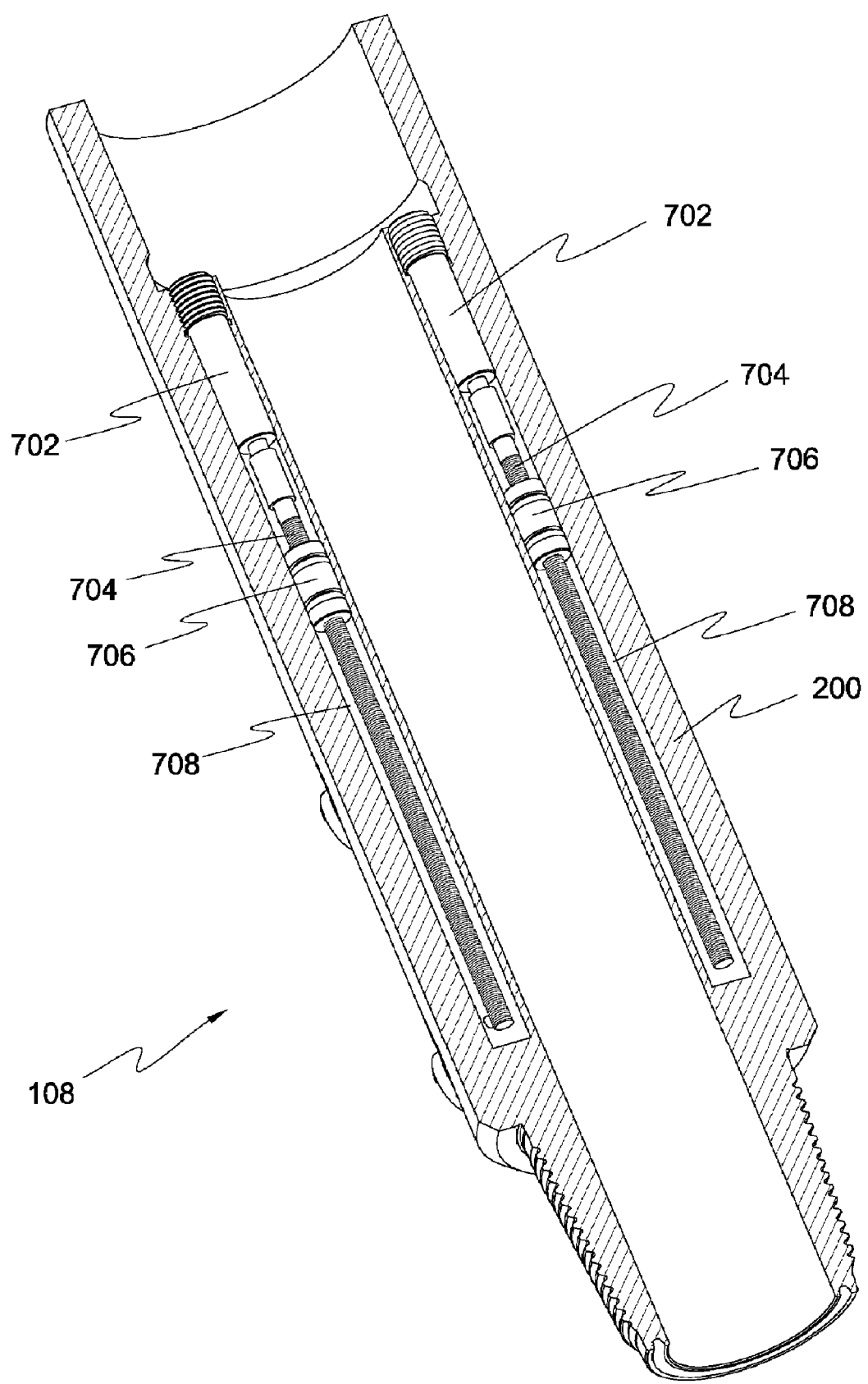
FIG. 7 is a cross-sectional perspective view illustrating one embodiment of a hydraulic system used with a receiver in accordance with the invention.
Figure 8:
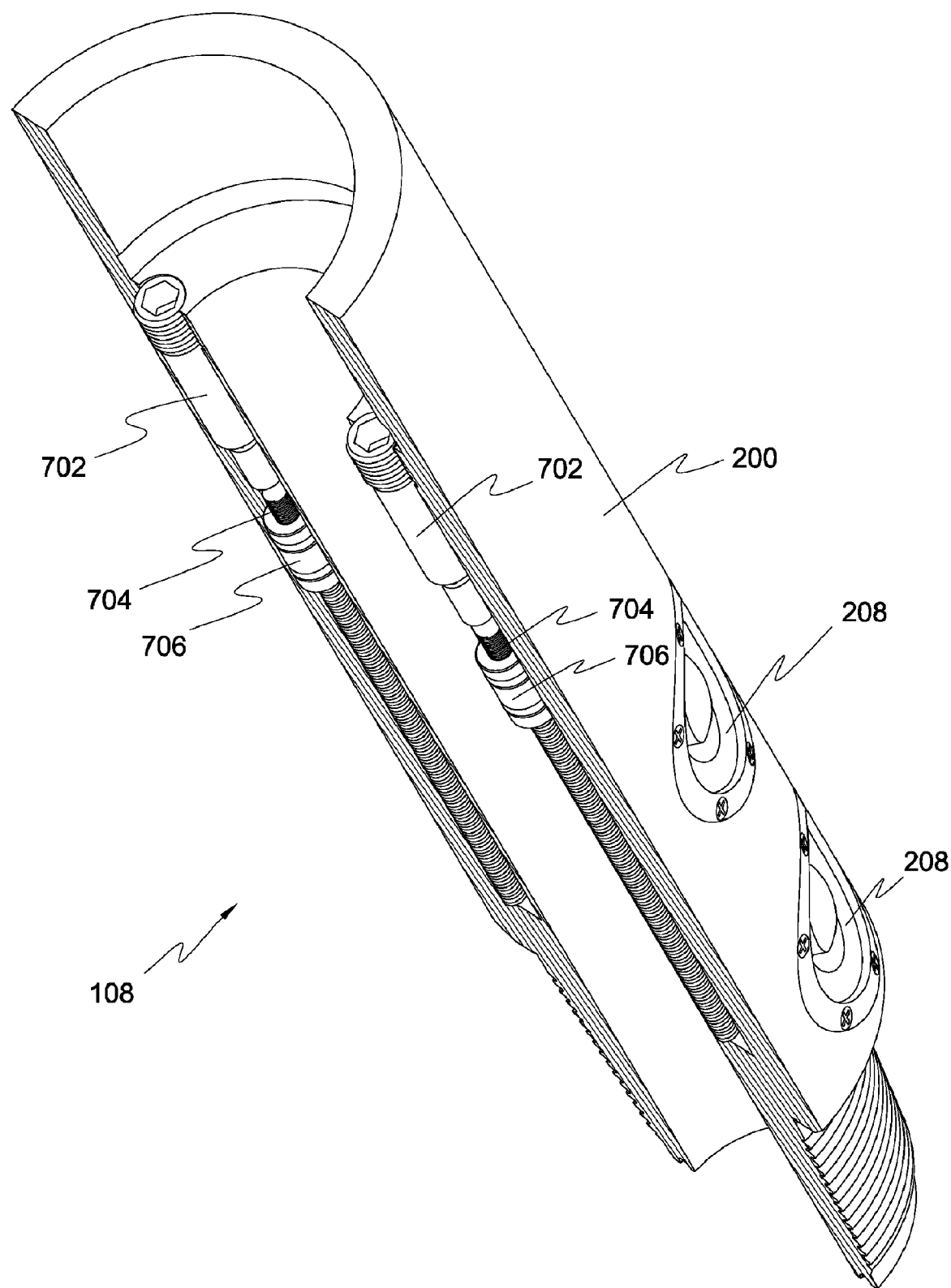
FIG. 8 is another cross-sectional perspective view illustrating an embodiment of a hydraulic system used with a receiver in accordance with the invention.

Referring to FIGS. 7 and 8, one embodiment of a hydraulic actuator for the receiver 108 is illustrated. In one embodiment, a hydraulic actuator includes a small electric motor 702 to drive a screw 704. The screw 704 engages an internally-threaded piston 706 that pressurizes sound-damping actuator fluid residing in a cavity 708. As was illustrated in FIGS. 5 and 6, fluid residing in the cavity 708 may be forced through various channels 604 in the housing 200, making up an actuator manifold, to actuate the individual diaphragms 208. In selected embodiments, several motors 702 and accompanying pistons 706 may be integrated into the housing 200 to provide a desired displacement. In certain embodiments, the actuator may be activated on command from the surface by way of a network integrated into the drill string 104, as was mentioned with respect to FIG. 2. After the sensors 112 have been actuated firmly against the borehole wall when the drill string 104 has stopped rotating, the motors 702 may reverse to retract the sensors 112 before continuing drilling.

As mentioned previously, the receiver 108 may be fail-safe against sticking in the hole because there is not a massive mechanism to couple the entire receiver 108 to the formation. The sensors 112 may have such low mass that the required placement force will only be on the order of a few tens of pounds. If the retraction mechanism fails for any reason, the diaphragms 208 may have sufficient flexibility to allow them to be dragged along with the receiver 108. In some cases, they may survive the failure condition to enable additional seismic and/or sonic measurements at different levels. In other cases, one or more of the diaphragms 208 may catch and tear, allowing the actuator fluid to escape into the borehole, whereupon the diaphragms 208 may return to their natural retracted positions. Although the receiver 108 may no longer function as intended during that trip and may require refurbishing, the receiver 108 would not become stuck.

Figure 9A:
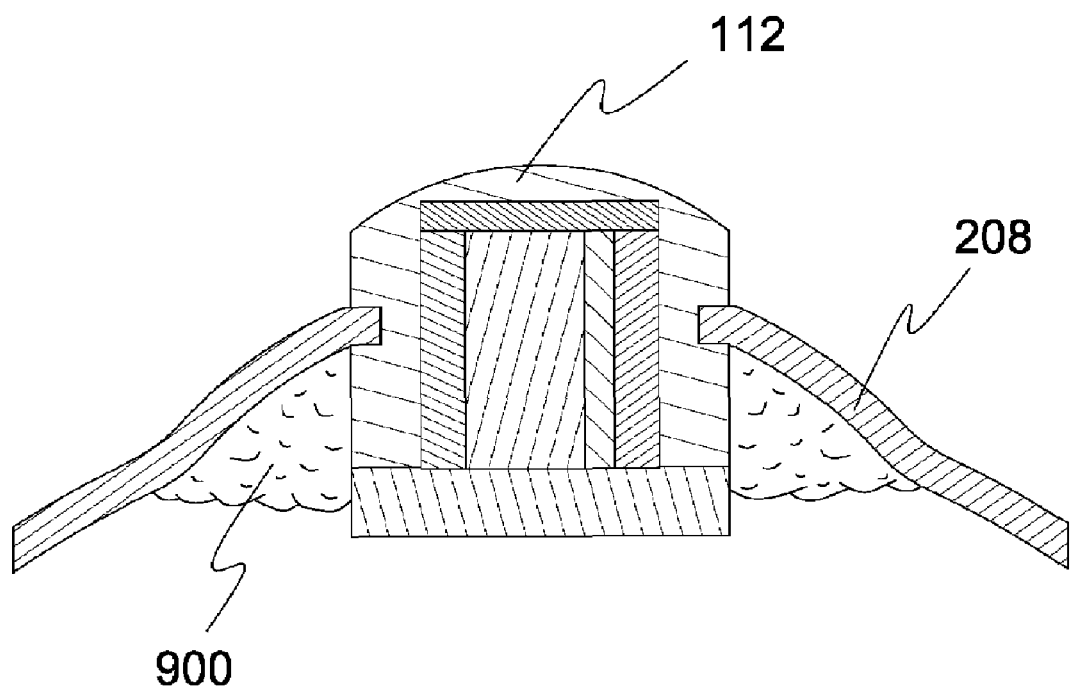
FIGS. 9A and 9B are cross-sectional views of one embodiment of a damping element incorporating a diaphragm and damping foam.
Figure 9B:
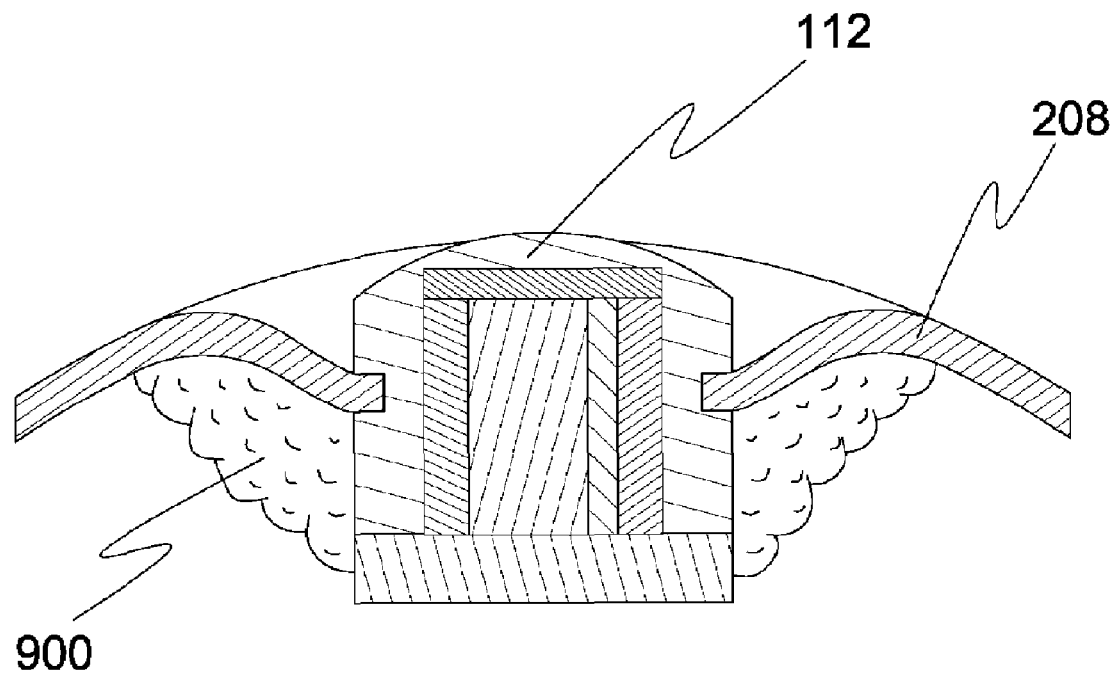

Referring to FIGS. 9A and 9B, as was mentioned in reference to FIGS. 5 and 6, in selected embodiments, the damping element 208 or diaphragm 208 may be filled with damping foam 900 to provide added damping between the receiver housing 200 and the sensor 112. In certain embodiments, the damping foam 900 is an elastomeric open-cell foam that may be filled with a supplementary damping material, such as microscopic particles of tungsten. FIGS. 9A and 9B show the damping elements 208, or diaphragms 208, in an outwardly extended and inwardly relaxed state, respectively, to show the contemplated movement of the foam 900 in connection therewith.

Figure 10A:
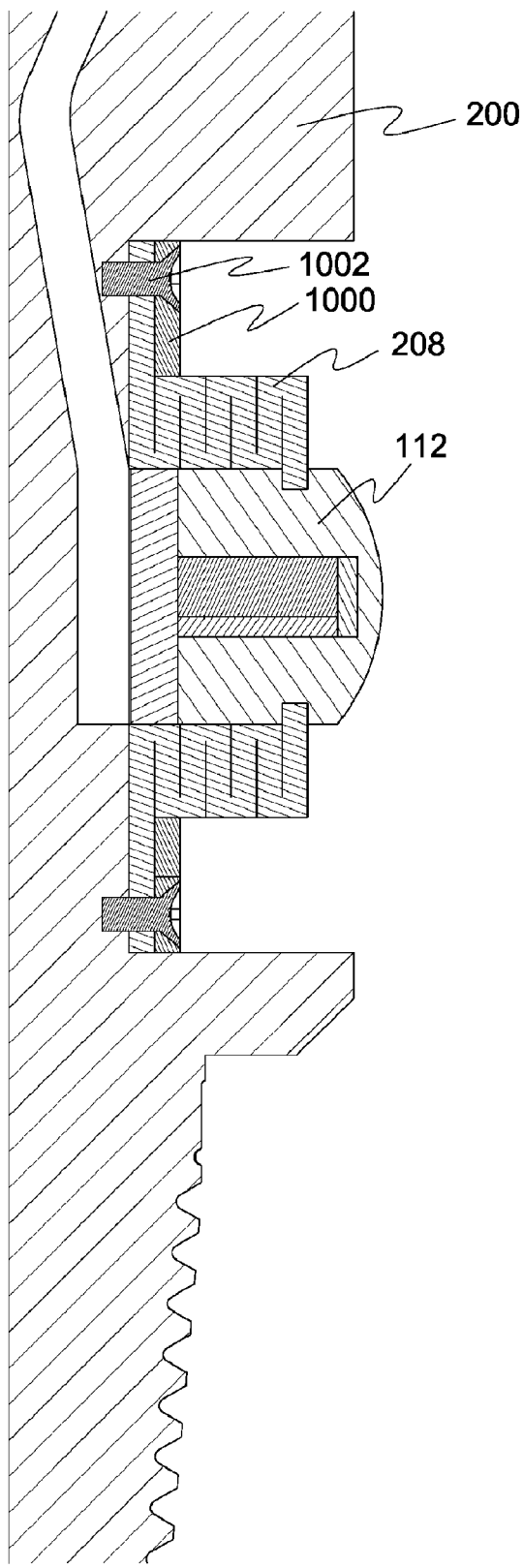
FIGS. 10A and 10B are cross-sectional views of one embodiment of a damping element incorporating a metal bellows.
Figure 10B:
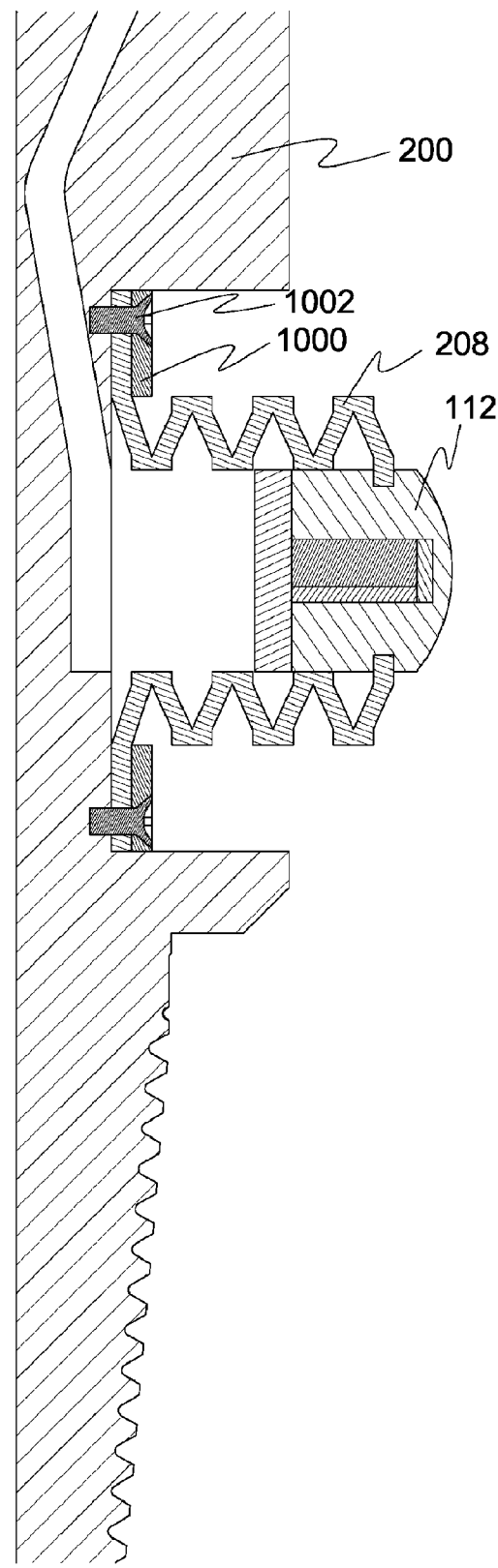

Referring to FIGS. 10A and 10B, in another embodiment, the damping element 208 may be embodied as bellows 208, such as a metal bellows 208. When inflated with a fluid, such as a gas or liquid, the bellows 208 may expand to extend the sensor 112 against the borehole wall. A shoe 1000 comprising various attachment elements 1002, such as screws, rivets, welds, or the like, may secure the outer edges of the bellows 208 to the housing 200. FIGS. 10A and 10B show the bellows 208 in an inwardly relaxed and outwardly extended state, respectively, to show the contemplated movement of the bellows 208 and sensor 112.

Figure 11:
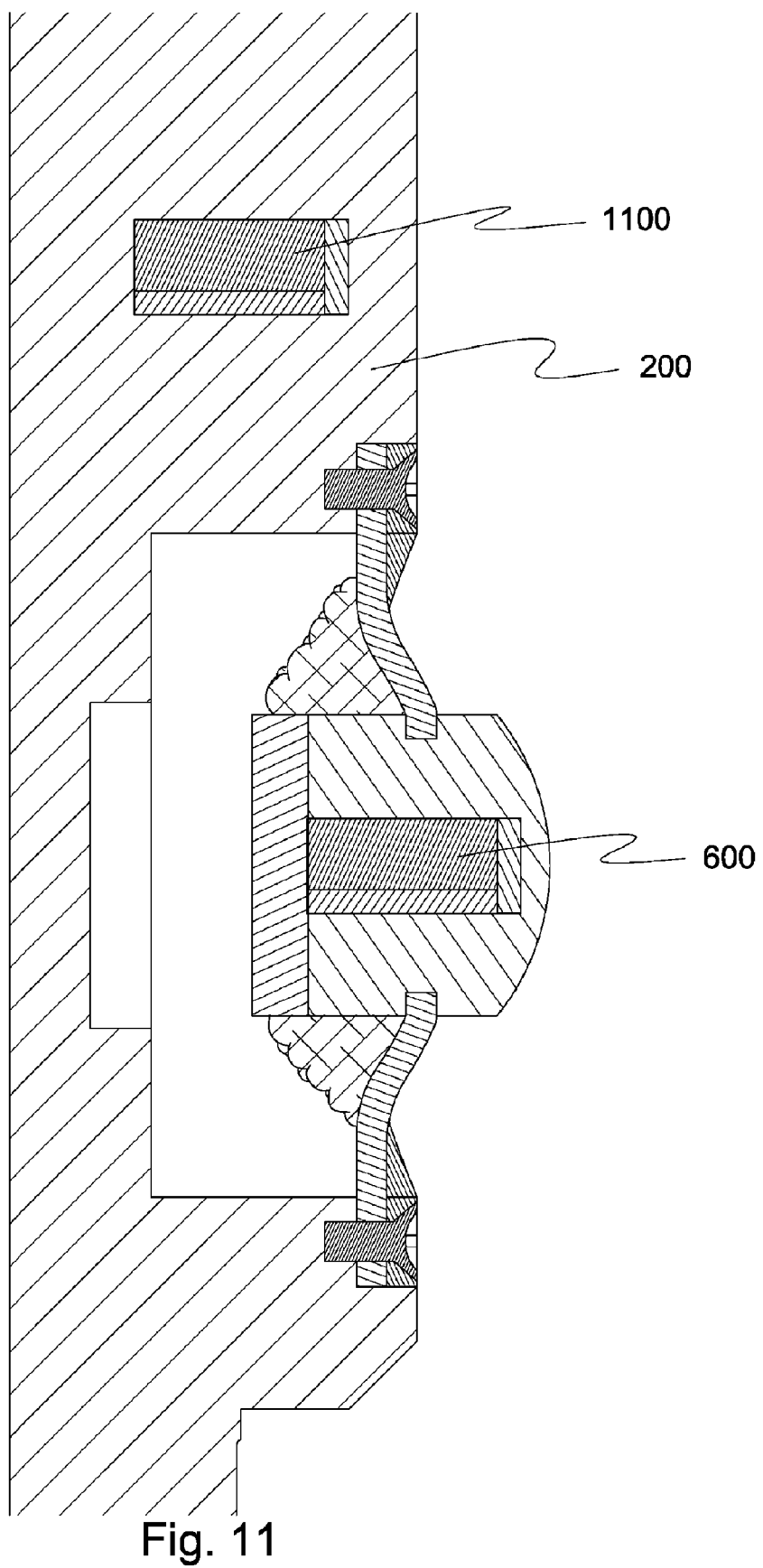
FIG. 11 is a cross-sectional view of one embodiment of an additional sensor used in the receiver to compensate for vibrations in the drill string.

Referring to FIG. 11, in selected embodiments, one or more geophones 1100, hydrophones 1100, or the like, may be mounted directly to the housing 200 to detect vibrations or other waves propagating through the drill string 104, as well as tube waves or other pressure waves that may be propagating through the borehole fluid. These waves may be much stronger than the seismic waves and can significantly interfere with VSP analysis. In the event that vibrations or other waves from the drill string 104 and borehole fluid interfere with the seismic or sonic waves detected by a geophone 600, the additional geophone(s) 1100 or hydrophone(s) 1100 may be used to subtract, filter out, or compensate for these unwanted vibrations and/or waves.

Figure 12:
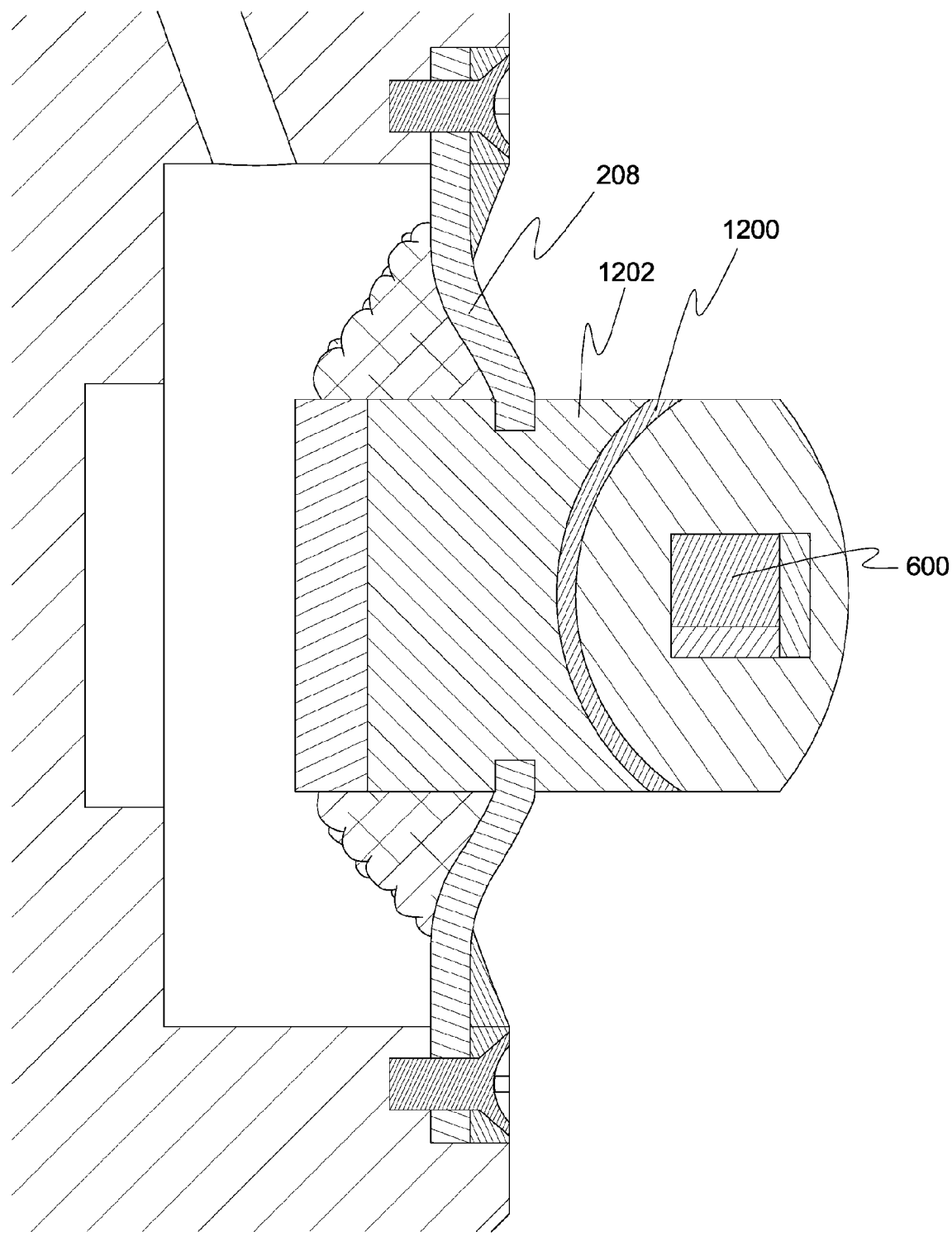
FIG. 12 is a cross-sectional view of one embodiment of a receiver incorporating an additional damping element to supplement a diaphragm.

Referring to FIG. 12, in selected embodiments, an additional damping layer 1200 may be disposed between a geophone 600 and the rest of the sensor structure 1202. The damping layer 1200 may be constructed of an elastomeric material and may optionally be filled or embedded with other damping materials, such as microscopic particles of tungsten. The structure 1202 behind the damping layer 1200 may be coupled to a diaphragm 208. Although not shown, wires or other transmission media may be routed through the damping layer 1200 to transmit information from the geophone 600 to processing circuitry (not shown) or the like.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. A downhole tool for gathering formation data from inside a borehole, the downhole tool comprising:
   a substantially tubular housing adapted for axial connection to a tool string;
   a plurality of sensors disposed radially about the tubular housing;
   a damping element between the tubular housing and each sensor, the damping elements flexibly coupling each sensor to the tubular housing; and
   an actuator to extend sensor substantially radially with respect to the tubular housing,
   wherein the damping elements are bellows.

2. The downhole tool of claim 1, wherein each sensor is selected from the group consisting of a one-component geophone, a three-component geophone, an accelerometer, a hydrophone, and a vibrometer.

3. The downhole tool of claim 1, wherein each sensor is selected from the group consisting of a laser-doppler vibrometer and a miniature electro-mechanical system (MEMS).

4. The downhole tool of claim 1, wherein the plurality of sensors comprise eight geophones arranged in a rectangular prismatic shape, the eight geophones situated at the corners of the rectangular prism proximate the outer periphery of the tubular housing.

5. The downhole tool of claim 4, wherein the rectangular prism is a cube.

6. The downhole tool of claim 4, wherein at least one of the eight geophones is a three-component geophone.

7. The downhole tool of claim 1, wherein the plurality of sensors comprise six geophones divided into three pairs, each pair used to measure the derivative of seismic waves along three mutually orthogonal axes.

8. The downhole tool of claim 7, wherein at least one of the six geophones is a three-component geophone.

9. The downhole tool of claim 1, wherein the damping elements further comprise a damping material selected from the group consisting of an elastomeric material, a rubber, a foam, a gel, and polymer rods.

10. The downhole tool of claim 1, wherein the actuator is a hydraulic actuator.

11. The downhole tool of claim 1, wherein at least one additional sensor is strongly coupled to the tubular housing to facilitate correction of measurements obtained from the at least one sensor to compensate for tool string vibrations that are not fully attenuated by the damping element.

12. A downhole drilling system for gathering formation data from inside a borehole, the downhole drilling system comprising:
   a downhole drilling string;
   a source operably connected to the downhole drilling string, the source adapted to generate at least one of seismic and sonic waves;

a receiver operably connected the drilling string and adapted to receive at least one of the seismic and sonic waves, the receiver comprising:

a substantially tubular housing adapted for axial connection to the drill string;

a plurality of sensors disposed radially about the tubular housing;

a damping element between the tubular housing and each sensor, the damping element flexibly coupling each sensor to the tubular housing; and an actuator to extend each sensor substantially radially with respect to the tubular housing, wherein the damping elements are bellows.

13. The downhole drilling system of claim 12, wherein each sensor is selected from the group consisting of a one-component geophone, a three-component geophone, an accelerometer, a hydrophone, and a vibrometer.

14. The downhole drilling system of claim 12, wherein each sensor is selected from the group consisting of a laser-doppler vibrometer and a miniature electro-mechanical system (MEMS).

15. The downhole drilling system of claim 12, wherein the plurality of sensors comprise eight geophones arranged in a rectangular prismatic shape, the eight geophones situated at the corners of the rectangular prism proximate the outer periphery of the tubular housing.

16. The downhole drilling system of claim 12, wherein each sensor comprises six geophones divided into three pairs, each pair used to measure the derivative of seismic waves along three mutually orthogonal axes.

17. The downhole drilling system of claim 12, wherein the actuator is a hydraulic actuator.

18. The downhole drilling system of claim 12, wherein at least one additional sensor is strongly coupled to the tubular housing to facilitate correction of measurements obtained from the at least one sensor to compensate for drill string vibrations that are not fully attenuated by the damping element.

19. A method for gathering formation data from inside a borehole, the method comprising:

providing a substantially tubular housing adapted for axial connection to a tool string;

providing a plurality of sensors disposed radially about the tubular housing;

providing a damping element between the tubular housing and each sensor, the damping element flexibly coupling each sensor to the tubular housing;

flexibly coupling each sensor to the tubular housing; and extending each sensor substantially radially with respect to the tubular housing, wherein the damping elements are bellows.

20. The method claim 19, wherein the plurality of sensors comprise three pairs of geophones, each pair used to measure the derivative of seismic waves along one of three mutually orthogonal axes.

21. The method of claim 19, wherein at least one additional sensor is strongly coupled to the tubular housing to facilitate correction of measurements obtained from the at least one sensor to compensate for drill string vibrations that are not fully attenuated by the flexibly coupling.

* * * * *